(12) United States Patent
Horie et al.

(10) Patent No.: US 6,533,644 B1
(45) Date of Patent: Mar. 18, 2003

(54) METHOD OF TEXTURING AND AGENT THEREFOR

(75) Inventors: Yuji Horie, Tokyo (JP); Hiromitsu Okuyama, Tokyo (JP); Mitsuo Otohata, Tokyo (JP)

(73) Assignee: Nihon Microcoating Co., Ltd., Tokyo (JP)

(*) Notice: Subject to any disclaimer, the term of this patent is extended or adjusted under 35 U.S.C. 154(b) by 246 days.

(21) Appl. No.: 09/697,547

(22) Filed: Oct. 26, 2000

(30) Foreign Application Priority Data

Jul. 17, 2000 (JP) .......................................... 2000-215584

(51) Int. Cl.$^7$ .................................................. B24B 1/00
(52) U.S. Cl. ........................... 451/36; 451/62; 451/302; 451/307; 428/141
(58) Field of Search ............................ 451/36, 63, 302; 51/307, 309; 29/603.16; 428/141

(56) References Cited

U.S. PATENT DOCUMENTS

| | | | | |
|---|---|---|---|---|
| 5,207,759 A | * | 5/1993 | Mehmandoust et al. | .... 451/284 |
| 5,586,926 A | * | 12/1996 | Wedell et al. | ............... 451/299 |
| 6,126,515 A | * | 10/2000 | Horie et al. | ................... 451/36 |
| 6,162,268 A | * | 12/2000 | Knapp et al. | ............ 106/211.1 |
| 6,280,489 B1 | * | 8/2001 | Horie et al. | .................... 106/3 |
| 6,328,774 B1 | * | 12/2001 | Shemo et al. | ................... 106/3 |

* cited by examiner

Primary Examiner—Joseph J. Hail, III
Assistant Examiner—Alvin J Grant
(74) Attorney, Agent, or Firm—Beyer Weaver & Thomas LLP

(57) ABSTRACT

An agent used for texturing a surface of a substrate for a magnetic disk includes an aqueous solution containing a glycol compound serving as surfactant in an amount of about 1–25 weight % and agglomerated polycrystalline diamond particles with average diameter of 0.01–2 μm in an amount of 0.001–3 weight % formed with very small polycrystalline diamond particles with average diameter of 1–20 nm. When the substrate surface is textured, the substrate is rotated, the agent is supplied to the target surface to be textured and a polishing tape is pressed and run against it. A substrate thus processed has a surface with very fine and uniform textured lines without any abnormal protrusions.

3 Claims, 2 Drawing Sheets

(a) INVENTION (b) COMPARISON (PRIOR ART)

This invention relates to a method of polishing materials
METHOD OF TEXTURING AND AGENT THEREFOR

BACKGROUND OF THE INVENTION

This invention relates to a method of polishing materials such as metals, glass, ceramics and plastics and to an agent for use for processing such materials. In particular, this invention relates to such an agent suitable for use in texturing substrates made of such materials for producing magnetic hard disks.

For producing magnetic disks, glass substrates and aluminum plates with a NiP-plated surface are widely being used. Such a magnetic disk is produced by first having its surface mirror-finished and textured and then having a magnetic layer formed thereon, say, by sputtering. The texturing is a production process by which concentric circular texture lines are created on the surface of the magnetic disk substrate for improving the magnetic characteristic of the magnetic disk as a magnetic recording medium by providing it with magnetic non-isotropy and also to prevent the adsorption between the magnetic head and the magnetic disk surface when the hard disk drive is not operating.

The recording capacity of a magnetic disk as a magnetic recording medium can be increased by reducing the distance between the magnetic head and the magnetic disk surface. Unless the texture lines on the surface of the magnetic disk substrate are formed uniformly, the magnetic head will strike abnormal protrusions on the magnetic disk surface. Unless the texture lines are finely formed, furthermore, the magnetic head tends to become adsorbed to the magnetic disk surface and hence its separation from the disk surface cannot be reduced and the recording capacity cannot be increased. In other words, the magnetic disk surface must be textured such that lines are finely produced and at a high density without leaving any abnormal protrusions on the surface in order to increase the recording capacity of the magnetic disk.

The texturing of a magnetic disk substrate is carried out by supplying a processing agent obtained by dispersing abrasive particles in water of an aqueous solution to the surface of the substrate and pressing and causing to run a woven or unwoven polishing cloth or a polishing tape against the substrate surface.

As for the texturing processing agent, use is commonly made of a slurry obtained by dispersing about 0.01–5 weight % of abrasive particles in an aqueous solution containing a glycol compound surfactant such as polyethylene glycol and polypropylene glycol in an amount of about 1–25 weight % in order to have the abrasive particles dispersed uniformly within the liquid and to prevent the precipitation of the abrasive particles while the agent is being kept in storage.

As for the abrasive particles, monocrystalline or polycrystalline diamond particles are used. Diamond particles are preferable because they are shaped regularly and variations are small in their sizes and shapes. Furthermore, they are hard and highly resistant against chemicals and heat. In particular, polycrystalline diamond particles are more widely used than monocrystalline diamond for texturing because they are round particles without sharp edges.

The agent for texturing is obtained by adding abrasive particle to an aqueous solution containing a surfactant, decomposing the secondary particles (agglomerated abrasive particles) in the liquid, say, by means of a ultrasound dispersing apparatus, after sufficiently stirring the mixture, and thereby causing the abrasive particles to be dispersed inside the liquid in the form of primary particles. A filter may preferably be further used to eliminate the secondary particles which may have agglomerated inside the liquid through precipitation. In summary, it was commonly believed that the surface of a magnetic disk substrate is damaged by the agglomerated secondary particles and this was why attempts were being made to decompose the secondary particles inside the liquid through ultrasonic waves or the like to disperse the abrasive particles inside the liquid in the form of primary particles.

Japanese Patent Publication Tokkai 11-138424, for example, disclosed an agent for texturing obtained by dispersing polycrystalline diamond particles with average diameter of 0.05–5 $\mu$m in the form of primary particles and it is reported that the surface of a magnetic disk substrate can be textured such that the average surface roughness Ra is 4.0 Å and there are hardly any abnormal protrusions which are visible on the surface.

With the recent increase in the speed of data processing by computers, however, the memory capacity of magnetic disks serving as magnetic recording media is required to be increased. Thus, further improvements in the texturing technology are required such that the surface of a magnetic disk substrate can be textured at a higher density without any abnormal protrusion left on the surface.

SUMMARY OF THE INVENTION

It is therefore an object of this invention in view of such demands for improved texturing technology to provide a method by which one or both of the surfaces of a substrate of a magnetic disk can be textured more uniformly and more finely than previously possible.

It is another object of this invention to provide an agent which may be used in such an improved method of texturing.

An agent for texturing embodying this invention, with which the above and other objects can be accomplished, may be characterized as comprising an aqueous solution containing glycol compounds in an amount of about 1–25 weight % serving as a surfactant and agglomerated polycrystalline diamond particles with average diameter of 0.01–2 $\mu$m comprised of polycrystalline diamond particles with average diameter of 1–20 nm in an amount of 0.001–3 weight % dispersed in this aqueous solution. Examples of surfactant which may be used according to this invention include glycol compounds such as polyethylene glycol and polypropylene glycol. Polyoxyethylene alkyl phenyl ether sodium phosphate may be appropriately used for the purpose.

For texturing a substrate such as a glass or aluminum substrate for a magnetic disk by a method embodying this invention, the substrate is rotated, the agent as described above is supplied to its surface and a woven, non-woven, foam or planted tape is pressed and run against it. It is to be noted that it is agglomerated polycrystalline diamond particles (secondary particles) which are agglomerations of primary polycrystalline diamond particles and have an average diameter within a specified range that are used as abrasive particles. It is further to be noted that these primary polycrystalline diamond particles which are agglomerated to form the abrasive particles of this invention have extremely small diameters, have little variations in size and shape, are hard, are highly resistant against chemicals and heat and are of a circular shape without sharp edges. If such primary polycrystalline diamond particles were directly used (that is, not in an agglomerated form) for the texturing process, they would easily pass through the space between the fibers of the woven, non-woven or planted tape which may be used for the polishing. If a foam tape were being used, such small diamond particles would easily go inside the bubble spaces on the surface of the tape. In other words, it would not be possible to dependably keep these particles on the tape surface to be pressed against the substrate surface to be textured.

Secondary polycrystalline diamond particles, by contrast, are agglomerations of a large number of extremely small round particles without sharp edges, having around themselves many extremely small protrusions formed by these primary particles. Since these extremely small protrusions come into contact with the surface of the substrate, the agglomerated polycrystalline diamond particles can remain on the surface of the tape more easily during the texturing process and can be pressed against the substrate surface more reliably. Because these secondary particles are agglomerations of extremely smaller primary particles, furthermore, this means that more particles process unit areas of the target substrate surface than if particles with the same diameters as secondary particles were used. As a result, the substrate surface can be textured extremely finely and uniformly if it is processed by using an agent according to this invention, containing agglomerated polycrystalline particles.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings.

DETAILED DESCRIPTION OF THE INVENTION

The invention is described next by way of an example with reference to FIG. 1 which shows a polishing machine 10 for polishing both surfaces of a substrate 17 by a method embodying this invention but a machine or polishing only one surface may be used according to this invention.

Figure 1:
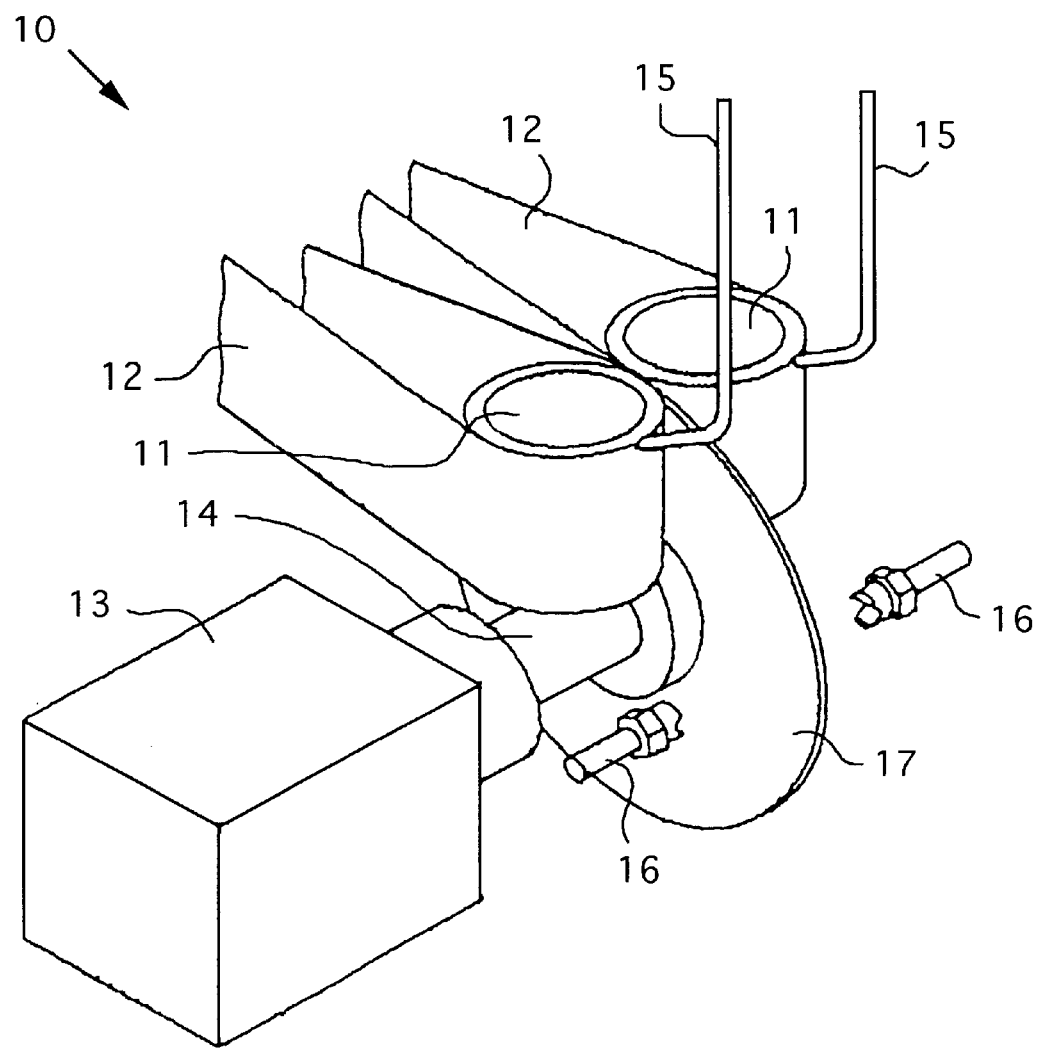
FIG. 1 is a schematic drawing of a polishing machine for using a method of polishing embodying this invention.

With reference now to FIG. 1, the substrate 17 is set on a shaft 14 connected to a driver motor 13. The driver motor 13 is activated to rotate the substrate 17, and an agent for texturing is supplied to both surfaces of the substrate 17 from nozzles 16. At the same time, tapes 12 are pressed and run against the surfaces of the substrate 17 by means of contact rollers 11. After the texturing process thus carried out, a washing liquid such as water is blasted onto the surfaces of the substrate 17 through the nozzles 16 to clean them. Use as the tapes 12 may be made, for example, of woven or non-woven cloth tape comprising plastic fibers of polyester, nylon or rayon with thickness 0.001–5 deniers, foam tapes (such as described in Japanese Patent Publication Tokkai 11-151651) having a foam layer of thickness 0.1–1 mm and hardness 10–90, say, of polyurethane foam affixed to the surface of a plastic tape of polyester or polyethylene terephthalate, or planted tapes having plastic fibers of length 0.05–0.5 mm, say, of nylon planted on the surface of a plastic tape of polyester or polyethylene terephthalate.

The agent for texturing comprises an aqueous solution containing glycol compounds in an amount of about 1–25 weight % serving as a surfactant and agglomerated polycrystalline diamond particles with average diameter of 0.01–2 $\mu$m comprised of polycrystalline diamond particles with average diameter of 1–20 nm in an amount of 0.001–3 weight % dispersed in this aqueous solution. Examples of surfactant which may be used according to this invention include glycol compounds such as polyethylene glycol and polypropylene glycol. Polyoxyethylene alkyl phenyl ether sodium phosphate may be appropriately used for the purpose.

As an actual demonstration, a machine as shown in FIG. 1 was used to texture an aluminum substrate for a magnetic disk (Superpolish (tradename) produced by Nippon Light Metals, Inc.). Use as agent for the texturing was made of a slurry prepared by adding as abrasive particles agglomerated polycrystalline diamond particles (in an amount of 0.03 weight %) with average diameter of about 1–20 nm into an aqueous solution containing (in an amount of 5 weight %) a glycol-type surfactant having polyoxyethylene alkyl phenyl ether sodium phosphate as the base. The composition of the texturing agent was therefore as shown in Table 1 below. As for the polishing tapes, non-woven cloth tapes with thickness 700 $\mu$m with nylon fibers with thickness 0.04 deniers were used.

TABLE 1

| Composition of Agent for Texturing | |
|---|---|
| Abrasive particles (as secondary particles with average diameter 0.1 $\mu$m): | 0.03 wt % |
| Surfactant: | 5 wt % |
| Pure water: | 94.97 wt % |

The texturing process was carried out under the conditions shown in Table 2.

TABLE 2

| Conditions for Texturing | |
|---|---|
| Time for processing: | 30 seconds |
| Speed of rotation of substrate: | 400 rpm |
| Linear speed of tapes: | 6 cm/min |
| Rate of supply of agent: | 15 cc/min |
| Hardness of controller: | 40 duro |
| Oscillation frequency: | 5 Hz |
| Oscillation amplitude: | 1 mm |
| Contact roller pressure: | 1.5 kg |

Figure 2:
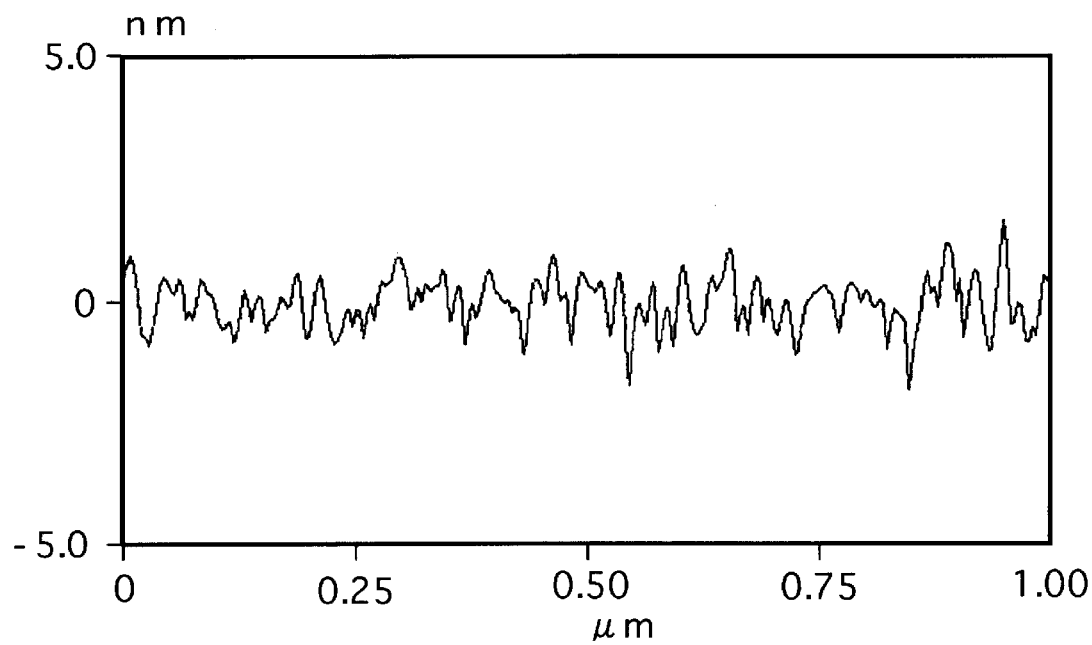
FIG. 2A is an enlarged sectional view of a portion of a substrate for a magnetic disk after a texturing process carried out by a method embodying this invention.
FIG. 2B is an enlarged sectional view of a portion of another substrate for a magnetic disk after a texturing process by a prior method, both showing the surface roughness of the substrate.
Figure 2:
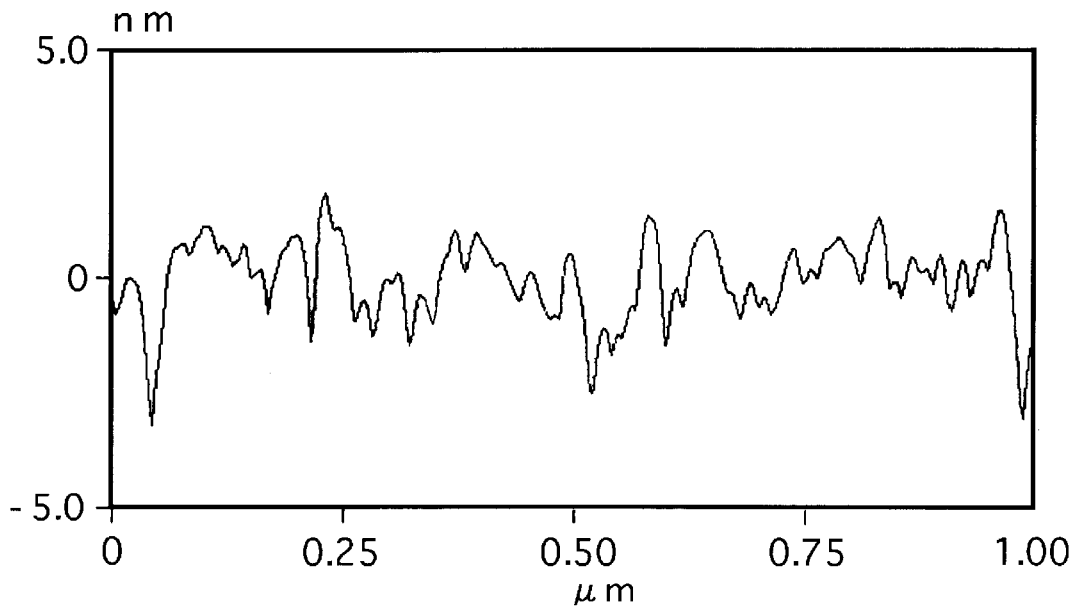

After the texturing process, the average surface roughness Ra and the smoothness condition of the surface were investigated. The average surface roughness was measured by using a scanning probe microscope (Nanoscope Dimension 3100 Series produced by Digital Instrument, Inc.) and by scanning a randomly selected test area of 30 $\mu$m×30 $\mu$m (at 256 points). The measured surface roughness was 3.0 Å. The surface condition as expressed by a sectional view taken in the radial direction (over a distance of 1 $\mu$m) is shown in FIG. 2A.

For comparison, another agent containing polycrystalline diamond particles having the same average diameter as the agglomerated polycrystalline diamond particles described above was used to texture an identical substrate under the otherwise same conditions (as shown in Table 2). This comparison agent was a slurry prepared by adding polycrystalline diamond particles (primary particles) with average diameter of 0.1 μm as abrasive particles into an aqueous solution containing (in an amount of 5 weight %) a glycol-type surfactant having polyoxyethylene alkyl phenyl ether sodium phosphate as the base and, after stirring the mixture sufficiently, decomposing the secondary particles which have agglomerated, say, by precipitation by ultrasonic means to thereby obtain a slurry having the primary particles dispersed therein. The composition of this comparison agent is shown in Table 3.

TABLE 3

| Composition of Comparison Agent for Texturing | |
|---|---|
| Abrasive particles (as primary particles with average diameter 0.1 μm): | 0.03 wt % |
| Surfactant: | 5 wt % |
| Pure water: | 94.97 wt % |

After the texturing process by using this comparison agent, the average surface roughness Ra and the smoothness condition of the surface were investigated similarly. The measured surface roughness was 4.0 Å. The surface condition as expressed similarly as in FIG. 2A is shown in FIG. 2B.

As can be understood by comparing FIGS. 2A and 2B, about twice as many textured lines are found on the surface of the substrate processed by a method of this invention. It can also be seen that more uniform and finer textured lines are obtained by the present invention.

What is claimed is:

1. An agent for texturing a surface of a substrate for a magnetic disk, said agent comprising:

an aqueous solution containing a glycol compound serving as surfactant in an amount of about 1–25 weight %; and agglomerated polycrystalline diamond particles with average diameter of 0.01–2 μm in an amount of 0.001–3 weight %, said agglomerated polycrystalline diamond particles comprising polycrystalline diamond particles with average diameter of 1–20 nm.

2. A method of processing a surface of a substrate for a magnetic disk, said method comprising the steps of:

rotating said substrate;

supplying an agent onto the surface of said substrate, said agent comprising an aqueous solution containing a glycol compound serving as surfactant in an amount of about 1–25 weight % and agglomerated polycrystalline diamond particles with average diameter of 0.01–2 μm in an amount of 0.001–3 weight %, said agglomerated polycrystalline diamond particles comprising polycrystalline diamond particles with average diameter of 1–20 nm; and pressing and running a polishing tape against the surface of said substrate to thereby polish said surface, said polishing tape being one selected from the group consisting of a woven cloth tape, an unwoven cloth tape; a foam tape and a planted tape.

3. A magnetic disk substrate having at least one surface which has been textured by a method comprising the steps of:

rotating said substrate;

supplying an agent onto the surface of said substrate, said agent comprising an aqueous solution containing a glycol compound serving as surfactant in an amount of about 1–25 weight % and agglomerated polycrystalline diamond particles with average diameter of 0.01–2 μm in an amount of 0.001–3 weight %, said agglomerated polycrystalline diamond particles comprising polycrystalline diamond particles with average diameter of 1–20 nm; and pressing and running a polishing tape against the surface of said substrate to thereby polish said surface, said polishing tape being one selected from the group consisting of a woven cloth tape, an unwoven cloth tape; a foam tape and a planted tape.

* * * * *